May 22, 1951 C. W. EARP 2,553,558

COURSE INDICATOR FOR RADIO DIRECTION SYSTEMS

Filed Jan. 25, 1947

INVENTOR
CHARLES W. EARP
BY R P Morris
ATTORNEY

Patented May 22, 1951

2,553,558

UNITED STATES PATENT OFFICE 2,553,558

COURSE INDICATOR FOR RADIO DIRECTION SYSTEMS

Charles William Earp, London, England, assignor to International Standard Electric Corporation, New York, N. Y., a corporation of Delaware Application January 25, 1947, Serial No. 724,317
In Great Britain March 7, 1939

Section 1, Public Law 690, August 8, 1946
Patent expires March 7, 1959

2 Claims. (Cl. 178—44)

The present invention relates to arrangements for accentuating the ratio of strengths of two different frequency currents to any desired degree and is especially applicable to aural indicators for radio guiding systems using a two-tone system.

In radio guiding systems of the kind in which different tone signals are transmitted on the left and right of the directive course, when a receiver is on the course the signals received are of equal strength, and it is difficult to determine from aural indications when the two tones of different frequencies are of equal strengths, and consequently for the pilot of an aircraft, for instance, to know when he is on the directive course.

It is an object of the present invention to provide arrangements whereby the ratio of the strengths of two signals may be accentuated to any desired degree, whereby a more exact and definite indication may be obtained when the signals received are of equal strength.

According to the invention, arrangements for automatically accentuating the ratio of the strengths of two signal currents of different frequencies $f_1$, $f_2$, comprise means for producing two fields inclined to each other and corresponding respectively to the two frequency currents, a coil movable relatively to the field coils and located in the said fields, means for applying the signal currents to the said coil and an output circuit associated with said coil.

According to a feature of the invention, an indicating device for use in a radio navigational system in which signals of different tone frequencies are transmitted on either side of a directive course, includes arrangements for automatically accentuating the ratio of two signal currents of different frequencies obtained on an appropriate receiver said arrangements comprising means for producing two fields inclined to each other and corresponding respectively to the two frequency currents a coil located in said fields and movable relatively thereto, means for applying the signal currents to the said coil and an output circuit associated with said coil.

Whilst the output circuit associated with the said coil includes the aural indicator, for instance, the earphones of the pilot of vehicle such as an aeroplane or ship using a radio guiding system, the relative movement between the coil and fields may also be employed to give a visual indication when equality in the strength of signals received has been obtained, or to the direction and amount of deviation of the vehicle from the course.

The invention will be better understood from the following description taken in conjunction with the accompanying drawings in which.

Figure 1:
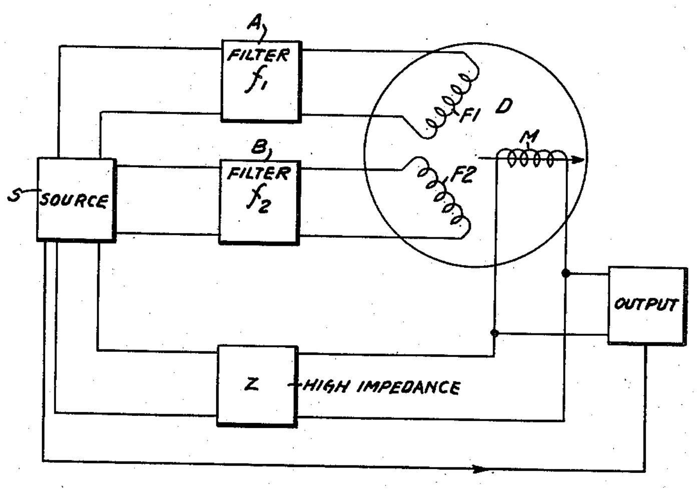
Fig. 1 illustrates the principle on which the invention is based.

Referring to Fig. 1 of the drawings, two tones of frequency $f_1$ and $f_2$ are passed from the source S through filters A and B. The outputs from A and B are applied to the "field" windings $F_1$, $F_2$ of a dynamometer instrument D.

The field coils $F_1$ and $F_2$ will, in general, be arranged at an angle greater than 90°, unless only slight accentuation of level difference be desired. The two tones are also applied to the moving coil M of the dynamometer, preferably through a high impedance Z. Preferably the currents of frequency $f_1$ in $F_1$ and M shall be in phase also the currents of frequency $f_2$ in $F_2$ and M shall be in phase.

The output is derived from the voltage appearing across the terminals of the moving coil, and to this output may be added signal currents from the source S, as indicated by the dotted line.

Now suppose that the tones $f_1$ and $f_2$ are of equal strength and that by the arrangement of strengths in $F_1$ and $F_2$, the torques exerted on M by $F_1$, and on M by $F_2$ are equal and opposite (hence establishing equilibrium) when the field coil M lies on the bisector of the obtuse angle between $F_1$ and $F_2$.

An increase in the ratio of strength of $f_1$ to $f_2$ will cause the coil M to move towards $F_1$. If the angle between $F_1$ and $F_2$ approximates to 180°, then a small change in the strength of signal of frequency $f_1$ will bring M into a position at right angles to $F_2$. In this condition, the voltage induced in M due to the coupling with $F_2$ is zero, but the voltage due to $F_1$ may be considerable. Neglecting, therefore, the voltage across M due to current flowing from S through Z, the voltage across M is entirely of frequency $f_1$, and output at frequency $f_2$ is zero.

Similarly, an increase in the ratio of strengths of $f_2$ to $f_1$ produces movement of M towards $F_2$. When M is at right angles to $F_1$, the output is at frequency $f_2$ only.

If "stops" be placed on the meter corresponding to these two positions, for all ratios between $f_1$ and $f_2$ greater than those already considered the output will be a single tone.

It will be seen that additional output may be obtained due to current from S passing through Z to the moving coil M. This can be minimised by making Z very large—that is—by making the ampere-turns of $F_1$ and $F_2$ much greater than for M. Alternatively the voltage across M due to current from S through Z may be balanced out by feeding signal currents (suitably attenuated) direct from S to the output, as indicated by the dotted line.

Another simple method for producing infinite ratios of strengths of $f_1$ to $f_2$ across M (when M presses against the stops), is to displace the stops from the right angle positions described, until the induced current in M from the field coil exactly balances out the unwanted frequency.

The above completes the explanation of the principle of the system. In practice, however, special modifications may be desirable.

Figure 2:
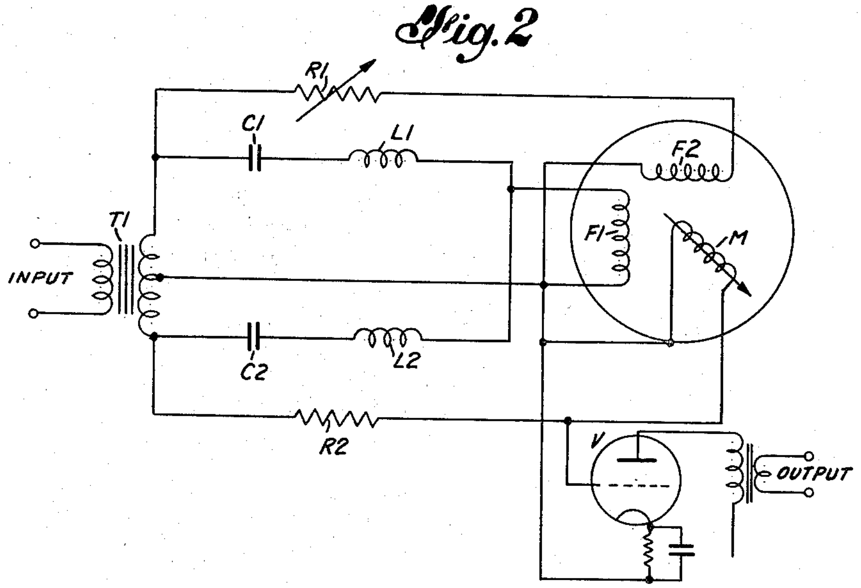
Fig. 2 shows schematically the circuit diagram of a preferred embodiment of the invention and given by way of example only.

First, it may not be convenient to make a dynamometer instrument with an angle other than 90° between the field coils. Also, it is evidently not necessary to provide perfect filtering in A and B, for the outputs at $f_1$ and $f_2$ are coupled together again in the dynamometer. Fig. 2 shows a practical system whereby a normal dynamometer may be used, and simple filtering provides effective fields at frequencies $f_1$ and $f_2$, the angle between the direction of these fields being adjustable.

By the tuning of C1 and L1, to resonance at $f_1$ current at frequency $f_1$ is passed through the field coil $F_1$, its phase being retarded by 90°, with respect to energy at $f_1$ through resistor R1.

By tuning C2 and L2, to resonance at $f_2$ current at frequency $f_2$ is passed through the field coil $F_1$, its phase being turned through 180° by the reversed connection to the secondary of T1, and retarded 90° with respect to energy through resistor R1, giving a net phase advance of 90°.

Currents of frequency $f_1$ and $f_2$ are both passed through resistance R1 to the second field coil $F_2$ of the dynamometer.

Then it will be observed that with respect to the currents in $F_2$ one of the frequencies in $F_1$ is leading the same frequency in $F_2$ by substantially 90° and the other frequency current in $F_1$ is lagging behind the corresponding frequency in $F_2$ by substantially 90°.

The combined fields due to $F_1$ and $F_2$ will now be at frequency $f_1$, advanced clockwise from $F_1$ by current in $F_2$, and at frequency $f_2$ turned anti-clockwise from $F_1$ by current in $F_2$. Hence there are two fields at frequencies $f_1$, $f_2$ inclined to each other at an angle dependent upon the relative strengths of the currents in $F_1$ and $F_2$.

Signal current is also passed through resistance R2 to the moving coil M and the current in M is exactly in-phase or anti-phase (for both frequencies $f_1$ and $f_2$) with the currents in the field coils, hence producing the maximum torque possible.

In the special case when no current is passed to $F_2$ (i. e. R1=infinity), the moving coil will be pulled in opposite senses by the currents of frequencies $f_1$, $f_2$ in coil $F_1$ since one of these frequencies is in phase and the other in opposite phase with the respective currents in M. For equal voltages at frequencies $f_1$ and $f_2$ applied to T1, circuit constants may be arranged so that no net torque is applied to M, and slight changes from equality up and down, will cause M to rotate to one or other of its possible positions in line with $F_1$.

For the same circuit constants, when current is passed to $F_2$ by R1, the condition of equality will cause the coil M to take up a position parallel with $F_2$ because currents of frequencies $f_1$, $f_2$ in M are in phase respectively with $f_1$, $f_2$ in $F_2$. Slight changes from the "equality" condition will cause deflections of M clockwise or anti-clockwise according to whether the ratio of signal strengths of $f_1$, $f_2$ is increased or decreased and the size of the deflection will depend upon the value of R1.

Thus if R1 is adjusted for a suitable angular sensitivity "stops" may be placed on the meter corresponding to the positions where only $f_1$, or only $f_2$ can be heard in the output circuit.

This output circuit is connected across the terminals of the coil M and is here shown as including a thermionic valve amplifier V whose input circuit is connected across the coil M and whose output circuit is connected via a suitable transformer to the aural indicator.

Whilst the invention has been described in arrangements for accentuating the ratio of signal strengths of two frequencies up to unity, the apparatus may be used for accentuating the signal strengths up to other ratio limits.

This may be achieved by variation of circuit constants, for instance, for increasing the attenuation of one of the frequencies more than the other or by varying the phase angle between the components of one of the frequencies producing the effective field.

Furthermore, the meter may serve as a visual indicator of "course" and may be calibrated in degrees from the zero position to the stops, providing only that the radio beacon is of a standard field-pattern.

Whilst one particular embodiment has been described, the invention is not limited to that embodiment and many variations may be made by those skilled in the art, all of which variations may fall within the scope of the appended claims. For instance, the output circuit may be coupled to the coil M in any desired manner, such as a second coil wound over the coil M or a second coil inductively coupled thereto. Also the "stops" may be removable, for instance in the form of press buttons so that they may be removed to allow the coil M to rotate through any angle and a pointer associated therewith and moving over a graduated scale will give a visual indication of the deviation from the course.

What is claimed is:

1. In an arrangement for determining when the two signals having different frequencies are of an equal energy level, means for automatically accentuating the ratio of the energy level of said two signals obtained on an appropriate receiver comprising a dynamometer having two field coils and a rotor coil, means for retarding the phase of one of said signals by 90° and advancing the phase of the other signal by 90°, means for applying said two last named signals to one field coil, means for retarding the phase of both said signals by 90°, and means for applying said last named two signals to the other field coil and to the moving coil, an output circuit, means for applying the resultant energy developed in said moving coil within the field of said field coils to said output circuit.

2. A direction indicator for use in comparing the relative field strengths of signals of different frequencies and accentuating their differences in strength upon departure from equality comprising a dynamometer having two right angularly related field coils and a rotatable coil mounted in the field thereof, a coupling transformer, means for applying said signals to the primary of said transformer, means for coupling opposite ends of one of said field coils through separate filter networks to opposite ends of the primary of said transformer and to the center tap of said transformer respectively, means for coupling said other field coil through a resistance between one end of said transformer and said center tap, means for coupling said rotor coil between said center tap and through a resistor to the other end of said transformer, an output circuit, and means for applying the resultant energy developed in said rotor coil within the field of said field coils to said output circuit.

CHARLES WILLIAM EARP.

REFERENCES CITED

The following references are of record in the file of this patent:

UNITED STATES PATENTS

| Number | Name | Date |
|---|---|---|
| 1,923,920 | Diamond et al. | Aug. 22, 1933 |

FOREIGN PATENTS

| Number | Country | Date |
|---|---|---|
| 863,522 | France | Apr. 3, 1941 |